US 6,552,842 B2

(12) United States Patent
Simpson et al.

(10) Patent No.: US 6,552,842 B2
(45) Date of Patent: Apr. 22, 2003

(54) REFLECTIVE COHERENT SPATIAL LIGHT MODULATOR

(75) Inventors: John T. Simpson, Knoxville, TN (US); Roger K. Richards, Knoxville, TN (US); Donald P. Hutchinson, Knoxville, TN (US); Marcus L. Simpson, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 109 days.

(21) Appl. No.: 09/834,422

(22) Filed: Apr. 13, 2001

(65) Prior Publication Data
US 2002/0149584 A1 Oct. 17, 2002

(51) Int. Cl.[7] .................. G02B 26/00; G02F 1/29; G02F 1/03
(52) U.S. Cl. .................. 359/318; 359/291; 359/247
(58) Field of Search .................. 359/48, 62, 83, 359/223, 224, 247, 253, 254, 290, 291, 295, 298, 318, 855

(56) References Cited

U.S. PATENT DOCUMENTS

| 4,941,735 | A | * | 7/1990 | Moddel et al. ........ 250/214 LA |
| 5,337,183 | A | | 8/1994 | Rosenblatt |
| 5,598,300 | A | * | 1/1997 | Magnusson et al. ........ 333/212 |
| 5,764,329 | A | * | 6/1998 | Chen et al. ................ 349/193 |
| 5,959,747 | A | * | 9/1999 | Psaltis et al. ............... 359/10 |
| 6,035,089 | A | | 3/2000 | Grann et al. |
| 6,091,463 | A | | 7/2000 | Robinson et al. |
| 6,215,928 | B1 | | 4/2001 | Friesem et al. |

FOREIGN PATENT DOCUMENTS

| WO | WO 00/62104 | 10/1999 |
| WO | WO 00/62104 | 10/2000 |

OTHER PUBLICATIONS

Grann, et al., "Artificial uniaxial and biaxial dielectrics with use of two–dimensional subwavelength binary settings,"J. Opt. Soc. Am. A, vol. 11, No. 10 (Oct. 1994) 2695–2703.
Kipfer, et al. "*Subwavelength Structures and their use in Diffractive Optics*". Opt. Engr, vol. 35, No. 3 Mar. 1, 1996 pp. 726–731; XP000597461.
E. Grann et al. "*Subwavelength structured narrow–band integrated optical grating filters*". 1998 diffractive optic and micro optics conference, Kailua, HI (United States), Jun. 8–12, 1998; DE98003389.
R. Boye. "*Physical Optics Approach to Guided Mode Resonance Filters*". 2000 The University of Arizona Ph.D. Dissertation.
Ichioka Y, Iwaki T, Matsuoka K *Optical information processing and beyond* P IEEE 84: (5) 694–719 May 1996.
Huan Xu et al. "*Optically enhancing the small electro-optical effect of a fast–switching liquid–crystal mixture*" Opt. Eng. 39, 1568 (2000).

* cited by examiner

Primary Examiner—Georgia Epps
Assistant Examiner—M. Abutayeh
(74) Attorney, Agent, or Firm—Akerman Senterfitt (57) ABSTRACT

A reflective coherent spatial light modulator (RCSLM) includes a subwavelength resonant grating structure (SWS), the SWS including at least one subwavelength resonant grating layer (SWL) have a plurality of areas defining a plurality of pixels. Each pixel represents an area capable of individual control of its reflective response. A structure for modulating the resonant reflective response of at least one pixel is provided. The structure for modulating can include at least one electro-optic layer in optical contact with the SWS. The RCSLM is scalable in both pixel size and wavelength. A method for forming a RCSLM includes the steps of selecting a waveguide material and forming a SWS in the waveguide material, the SWS formed from at least one SWL, the SWL having a plurality of areas defining a plurality of pixels.

35 Claims, 7 Drawing Sheets

REFLECTIVE COHERENT SPATIAL LIGHT MODULATOR

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

This invention relates generally to optical devices, and more particularly to spatial light modulators.

BACKGROUND OF THE INVENTION

Spatial light modulators (SLMs) are currently used in a variety of optical systems. They can be used for controlling (modulating) the intensity of an incident optical signal. SLMs operate as either as transmissive or reflective devices. A flat panel laptop computer screen is an example of a two-dimensional array of transmissive SLMs. Most SLMs have relatively slow switching speeds. For example, SLMs made with liquid crystals generally have speeds from a hundred hertz to a few kilohertz. The speed of liquid crystal SLMs are limited by the time required to align (transmissive) or twist (reflective) liquid crystals under the influence of an applied electrical field.

Acoustic-optic modulators (AOMs) use acoustical standing waves to modulate light and can have switching speeds of up to a few megahertz, but these devices are also bulky. Relatively new micro electromechanical structure (MEMS) micro-mirror SLM switches can operate in the kilohertz to megahertz range, but are usually bulky as well.

Small optical structures have been developed which rely interactions between a periodic medium which has a periodicity comparable to (or smaller than) the wavelength of electromagnetic waves traveling therethrough. In this case, the medium begins to significantly inhibit the wave's propagation. Sub-wavelength grating structures (SWS) are a type of optical structure that rely on this sub-wavelength effect.

An example of the formation and several applications for a SWS is described in U.S. Pat. No. 6,035,089, to Grann, et. al. ("Grann"), which is assigned to Lockheed Energy Research Corporation, predecessor to the assignee of this application. The entire contents of U.S. Pat. No. 6,035,089 is hereby incorporated by reference. Grann describes a subwavelength resonant grating structure (SWS) formed from a single subwavelength resonant grating layer (SWL), which functions as a zeroth order diffraction grating. Grann's SWS uses periodically spaced high refractive index "posts" embedded in a lower refractive index dielectric waveguide material to form an extremely narrowband resonant reflector that occupies a very small area.

A SWS which functions as a zeroth order diffraction grating can be represented by an effectively uniform homogeneous material having an effective refractive index (neff). Under particular incident wave configurations, such as a substantially normal incident beam, and certain structural constraints, such as the refractive index of the medium surrounding the SWS<refractive index of the waveguide<refractive index of the posts, a SWS may exhibit a resonance anomaly which results in a strong reflected beam which is limited to an extremely narrow bandwidth. If the incident radiation is not within the SWS resonant bandwidth, most of the energy of the incident beam will propagate through the grating in the form of a transmitted beam.

This resonance phenomenon occurs when electromagnetic radiation is trapped within the grating material due to total internal reflection. If this trapped radiation is coupled into the resonant mode of the SWS grating, the field will resonate and redirect substantially all of the electromagnetic energy backwards. This resonance effect results in a nearly total reflection of the incident field from the surface, which may be designed to be extremely sensitive to wavelength.

If SLMs could be configured using SWS, improved SLM performance could result. This could benefit existing SLM applications and provide new applications for SLMs that were never before possible.

SUMMARY OF THE INVENTION

A reflective coherent spatial light modulator (RCSLM) includes a subwavelength resonant grating structure (SWS). The SWS is formed from at least one subwavelength resonant grating layer (SWL), the SWLs having a plurality of areas defining a plurality of pixels. Each pixel represents an area capable of individual control of its reflective response. The pixels are adapted to produce a resonant reflective response characterized by reflecting a band of incident light while transmitting light outside the reflective band. A structure for modulating the resonant reflective response of at least one pixel is also provided.

The structure for modulating can include at least one electro-optic layer, the electro-optic layer disposed in optical contact with at least one SWL. In this embodiment, the RCSLM can include a structure for modulating the refractive index of the electro-optic layer.

The RCSLM can include a first electrically conductive layer and a second electrically conductive layer, the electro-optic layer positioned substantially between the electrically conductive layers. At least one of the electrically conductive layers can include a plurality of plates, the plurality of plates substantially electrically isolated from one another and adapted to control the resonant reflective response of individual ones of the plurality of pixels.

The RCSLM can be formed on a die and can have electronic components provided thereon, including control electronics and a high speed voltage driver circuit, to permit the plurality of pixels to be separately switchable. Switching can be accomplished by application of a voltage signal generated by the high speed voltage driver circuit to the plurality of plates. The plurality of plates can be adapted for connection to the electronic components through back plane via connections. The RCSLM can include an anti-reflective coating layer disposed on the surface of the RCSLM.

In the embodiment having electrically conductive electrodes and at least one electro-optic layer therebetween, an anti-reflective coating layer can be disposed on the surface of the RCSLM and a buffer layer can be disposed between the anti-reflective coating layer and the second conductive layer. The buffer layer can be selected from air, $SiO_2$, $TiO_2$, and WO.

SWLs can include a plurality of features, at least a portion of the features having asymmetric exposed surfaces. In this embodiment, The RCSLM can include an electronically controllable quarter wave plate.

In the embodiment having electronic components formed on die, the electronic components can also include an amplitude controller for controlling the amplitude of light reflected from the plurality of pixels. The amplitude controller can include a feedback and control system. The feedback and control system can be adapted to separately control the amplitudes of light reflected by the pixels.

A method for forming a reflective coherent spatial light modulator (RCSLM), includes the steps of selecting a waveguide material having a first refractive index, and forming at least one subwavelength resonant grating structure (SWS), the SWS formed from at least one subwavelength resonant grating layer (SWL) in the waveguide material. The SWLs each have a plurality of areas defining a plurality of pixels, the plurality of pixels adapted to produce a resonant reflective response characterized by reflecting a band of incident light while transmitting light outside the reflecting band. The SWL can include a plurality of features formed from at least one material having a second refractive index greater than the first refractive index of the waveguide material.

The method can include the step of providing at least one electro-optic layer, the electro-optic layer disposed in optical contact with at least one SWL. The method can include a first electrically conductive layer and a second electrically conductive layer, the at least one electro-optic layer positioned substantially between the electrically conductive layers. At least one of the electrically conductive layers can include a plurality of electrically conductive plates, the plates substantially electrically isolated from one another and adapted to control the resonant reflective response of individual pixels.

The method can include the step of providing a bulk substrate material having a plurality of die, wherein a plurality of RCSLMs are formed on the plurality of die. The method can include the step of forming electronic components including control electronics and a high speed voltage driver circuit on the die, wherein the pixels can become separately switchable by application of a voltage signal from the high speed voltage driver circuit to conductive electrode plates to impose an electrical field across at least one electro-optic layer. The method can include the step of forming a plurality of back plane via connections, where the plurality of plates can be provided electrical connection to the electronic components. At least one SWL can include a plurality of features, at least a portion of the plurality of features having asymmetrical exposed surfaces.

The invention can be used in embodiments which use multiple RCSLMs. For example, a high rate projection image system includes at least three RCSLMs, each RCSLM adapted to reflect a different wavelength band. Each RCSLM includes a subwavelength resonant grating structure (SWS). The SWS is formed from at least one subwavelength resonant grating layer (SWL), the SWLs having a plurality of areas defining a plurality of pixels. The pixels are adapted to produce a resonant reflective response characterized by reflecting a band of incident light while transmitting light outside the reflective band. A structure for modulating the resonant reflective response of at least one pixel is also provided.

A structure for providing light beams supplies light to each RCSLM, the light beams providing wavelengths within the respective RCSLM wavelength bands. A viewing screen receives reflected light from the RCSLMs.

In another embodiment of the invention, a method for modulating light includes providing a reflective coherent spatial light modulator (RCSLM). The RCSLM includes a subwavelength resonant grating structure (SWS), the SWS formed from at least one subwavelength resonant grating layer (SWL), the SWLs having a plurality of areas defining a plurality of pixels. At least one pixel is adapted to produce a resonant reflective response characterized by substantially reflecting a band of incident light. A structure for modulating the resonant reflective response of the at least one pixel is provided. The reflective response of the at least one pixel is modulated, whereby the band of light is substantially transmitted by at least one pixel.

The modulation can be electronic modulation. Preferably, the electronic modulating is electro-optic modulation. Electro-optic modulation can be implemented by applying a voltage to at least one electro-optic layer, the electro-optic layer disposed in optical contact with at least one pixel. The voltage applied is preferably capable of variation, wherein the voltage variation can modulate the reflective response of at least one pixel.

The plurality of pixels can be separately controllable and adapted to produce a plurality of distinct resonant reflective responses. This permits the step of separately modulating the reflective responses of the plurality of pixels. Preferably, the modulation is electro-optic modulation.

A method for processing an electromagnetic signal comprises the step of utilizing a reflective coherent spatial light modulator (RCSLM) which includes a subwavelength resonant grating structure (SWS). The SWS is formed from at least one subwavelength resonant grating layer (SWL), the SWLs having a plurality of areas defining a plurality of pixels. Each pixel represents an area capable of individual control of its reflective response. The pixels are adapted to produce a resonant reflective response characterized by reflecting a band of incident light. A structure for modulating the resonant reflective response of at least one pixel is also provided. The utilizing step can include at least one selected from the group consisting of image projecting systems, 3-D holographic projecting and communications transceiving.

A coherent spatial light reflector adapted for fixed frequency operation includes a subwavelength resonant grating structure (SWS). The SWS is formed from at least one subwavelength resonant grating layer (SWL), the SWLs having a plurality of areas defining a plurality of pixels. The pixels are adapted to produce a resonant reflective response characterized by reflecting a band of incident light while transmitting light outside the reflective band.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE PREFERRED EMBODIMENTS

Figure 1:
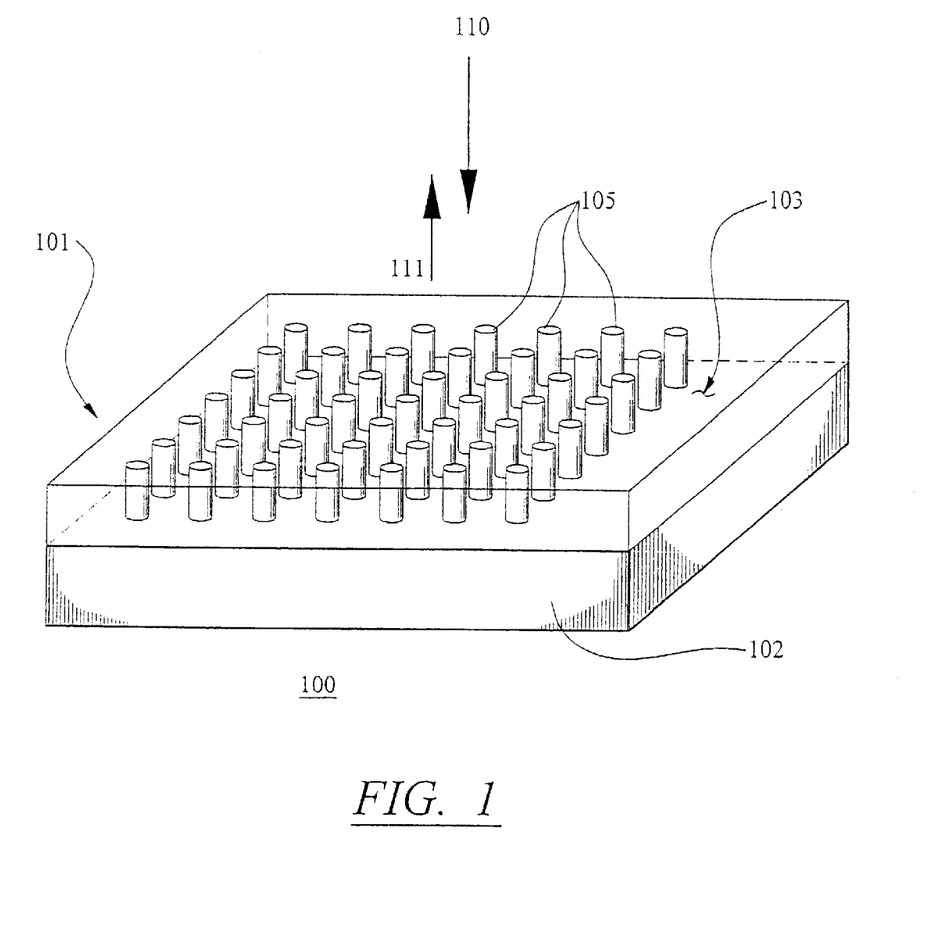
FIG. 1 illustrates a reflective coherent spatial light modulator (RCSLM) formed from a 2D subwavelength resonant grating structure (SWS) according to an embodiment of the invention.

Referring to FIG. 1, a reflective coherent spatial light modulator (RCSLM) 100 is shown according to an embodiment of the invention. In this embodiment, RCSLM 100 comprises a high "Q" reflective surface formed from a two dimensional (2-D) sub-wavelength grating structure (SWS) 101 formed from a single subwavelength resonant grating layer (SWL). Unless otherwise noted herein, SWS 101 will refer to a structure having a single SWL. SWS 101 comprises a plurality of posts 105 in a waveguide layer 103. SWS 101 can include optional substrate 102, which can provide cladding and physical support for SWS 101. Preferably, substrate 102 is a low refractive index, non-highly optically absorbent material in the wavelength range of interest. For example, Al, $BaF_2$, and ZnSe can be used as substrate materials for some RCSLM 100 applications. Substrate 102, is generally, but not necessarily, distinct from later defined bulk substrate material.

Small areas of SWS 101 can each comprise a separate pixel. Each pixel represents an area capable of individual control of its reflective response. The grating period of SWS 101 may be defined as the distance between analogous SWS feature portions (e.g. center to center). The grating period is nominally one half of a resonant wavelength, but generally always less than one wavelength to provide the desired subwavelength effects. Because incident light 110 impinging on the surface of SWS 101 generally originates from air, the appropriate resonant wavelength to use in later described grating calculations for air interface applications is nearly the free space wavelength of the light, since the refractive index of air is nearly equal to 1.

Assuming, as an example only, that four posts 105 are used to comprise a pixel, the resulting minimum grating length for a linear array of posts is approximately 2.0 resonant wavelengths per pixel. For red light, this would correspond to approximately $1.5\mu$ per pixel. This would equate to an approximate pixel area of approximately $2.25\mu^2$. However, it may be possible for a single SWS 101 feature, such post 105, to itself comprise a RCSLM pixel through use of appropriate feature spacings and/or imposed physical boundary conditions.

As will be described in detail later, the resonant response of RCSLM 100, which is determined primarily by the resonant response of SWS 101, can be set by the selection of appropriate grating parameters. Thus, discrete RCSLM areas each comprising pixels can each be separately configured to produce a resonant response having any desired center resonant wavelength. For example, RCSLM 100 can comprise a SWS 101 having a plurality of interspersed red (approximately 6300 Å), blue (approximately 4800 Å) and green (approximately 5500 Å) pixels. Alternatively, RCSLM 100 can be configured to produce any desired wavelength (not just the primary colors), resulting in the ability to create "real color" images.

As noted earlier, RCSLM 100 is formed from SWS 101, where SWS 101 is generally formed from a single SWL. However, RCSLM 100 can be formed from a SWS comprising multiple SWLs, the SWLs stacked on one another. However, it is noted that stacking SWLs can introduce limitations not present in single SWL implementations, since each SWL should be a waveguiding structure relative to its surroundings. Thus, taking into account contributions from the waveguide material and the feature material, each SWL should have a higher effective refractive index compared to the refractive (or effective refractive index) of all surrounding layers.

Accordingly, if SWS is formed from multiple SWLs, adjacent SWL layers should include one or more buffering layers disposed between the SWLs to limit cross-coupling between the SWLs. The buffering layer should also preferably have a refractive index that is lower than the effective refractive index of adjacent SWLs, due to the above described waveguiding considerations.

Although described in terms of applications for visible light, the invention is in no way limited to processing visible light. Infrared radiation or ultraviolet radiation, for example, can be processed using the invention provided SWS features such as 105, are sized appropriately and appropriate materials are used. Even x-ray radiation approaching atomic dimensions (on the order of several Å) can be processed by RCSLM 100, provided manufacturing equipment is provided for forming the required layer and feature dimensions appropriate for processing x-ray radiation.

Feature shapes can also influence the SWS resonant response. Shapes such as square, cylindrical and rectangular have been demonstrated with successful results. Many other shapes are also possible.

When two or more posts 105 comprise a pixel, posts may be arranged in a line or other arrangements which allow an approximately constant post-to-post spacing within each SWS area comprising a given pixel. For example, appropriately spaced posts may be placed along an arc having a given radius of curvature or in a square configuration.

When an incident photon beam 110 impinges on SWS 101, a portion of the incident beam is reflected as a reflected photon beam 111. If a large percentage of incident beam 110 is reflected, SWS 101 is referred to as a mirror. If SWS 101 functions as a mirror over a narrow range of wavelengths, SWS 101 may be said to be a narrowband mirror. The reflective bandwidth of a SWS may be defined to be a range of wavelength values within the SWS's response which are within 3 dB of the SWS peak reflective response. For example, if SWS is fully reflective (nearly 100%) at a given center wavelength and a horizontal line is drawn at 70.71% (3 dB) below the peak reflectivity, a wavelength value above and below the center wavelength will be cut. The difference between the two wavelengths cut by the 3 dB line may be defined to be equal to the SWS's bandwidth.

The preferred SWS 101 3 dB bandwidth depends on the RCSLM's 100 particular application. RCSLM 100 applications requiring switching, will generally prefer narrow reflective bandwidths to permit switching between reflection and transmission modes. For example, for a communications application which uses a highly monochromatic laser source, the preferred SWS 3 dB bandwidth would be extremely narrow, such as 2 nm. For a television applications where light reflected is used to activate light sensitive phosphors, it would generally be preferable to match the SWS bandwidth to the phosphor sensitivity, which can be as large as 100 nm, or more.

Figure 2:
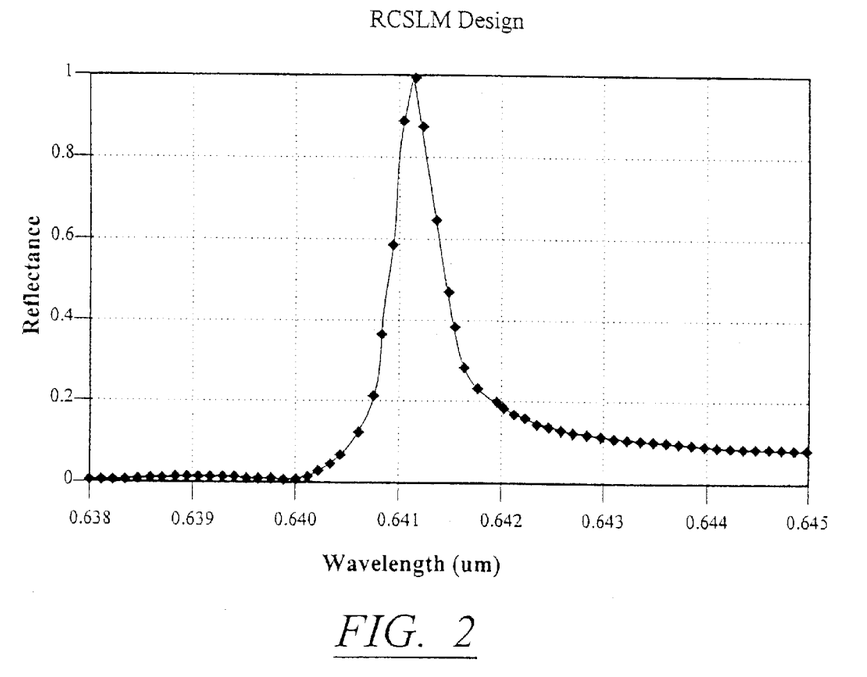
FIG. 2 illustrates the spectral response of a RCSLM formed according to an embodiment of the invention.

FIG. 2 illustrates the calculated spectral response of a RCSLM formed from a narrowband reflective SWS over a wavelength range of interest in the visible range around $0.6412\mu$. The 3 dB bandwidth shown is approximately 5 Å. In this example, the SWS grating was formed in a $BaF_2$ (n=1.39) waveguide with square sapphire posts (n=1.76). Post size was $0.23\mu$ by $0.23\mu$ with a post thickness of $0.60\mu$, the posts arranged in a checkerboard pattern. The light's angle of incidence was 45°. The light was TM (transverse magnetic) polarized.

Although FIG. 2 illustrates a SWS demonstrating a relatively narrowband resonant reflective response, SWS may exhibit no resonances (highly transmissive), an extremely narrow resonance, broadband resonance, or a resonance somewhere between narrow and broad. The transmission characteristics of a SWS is determined by factors including the grating period, the refractive index difference between the waveguide and post materials, and the post shape. Determination of appropriate grating parameters for SWS to produce desired resonant reflective characteristics generally requires solution of Maxwell's equation and repeated iterations through adjustments of SWS parameters including the grating period, the refractive index difference between waveguide material and post material, as well as the post shape.

Software simulations are preferably used to solve Maxwell's equations applied to photons interacting with a SWS. This problem is usually solved using "rigorous coupled wave equation" simulations. For example, GSOLVER© grating simulation software produced by Grating Software Development Company, located in Allen, Tex., may be used to simulate photon interactions with SWS layers.

The grating variables involved in setting the spectral response of a SWS include the refractive index of the post material, the refractive index of the waveguide material, the grating period and the fill factor, also referred to as the "duty cycle." The fill factor or duty cycle is defined as the fraction of area within the grating region containing posts. Post, waveguide and cladding material (if provided) are chosen such that the refractive index of the post material exceeds the refractive index of the waveguide material, and the refractive index of the waveguide material exceeds the refractive index of any cladding material.

A desired center resonant wavelength $\lambda_0$ is then selected. The initial fill factor may be set at 50%, for example, when the width of individual post is equal to one half of the grating period. The required grating period to achieve a desired center resonant wavelength $\lambda_0$ may be estimated. The following equation below provides an estimate of the grating period (T) required to achieve a resonant reflectance at a desired center resonant wavelength $\lambda_0$, given the waveguide refractive index ($n_g$) and post refractive index ($n_{sws}$).

$$T = 3 \lambda_0 / (n_g * n_{sws})$$

Using a rigorous coupled wave equation software package, such as GSOLVER©, the SWS response may be simulated over a range of wavelengths and the resulting center resonance wavelength $\lambda_0$ determined. Once a grating period is found that results in the desired center resonance reflectance wavelength $\lambda_0$, the simulation tool may proceed to produce the desired SWS bandwidth.

The reflective resonance bandwidth of a SWS may be changed by adjusting the post fill factor and the shape of the posts, or both the fill factor and post shape. As a preferred method, the post fill factor is first either increased or decreased, and the results resimulated. This iterative method may be continued until the bandwidth is obtained. If the bandwidth is not optimized for a given set of parameters, the bandwidth may be further changed by changing post shape. For example, in the case of square posts, rectangular posts may be substituted and the results re-simulated.

This process can be continued to find proper SWS parameters to produce desired center resonant reflectance values, for example, parameters to reflect red, green and blue light, respectively. As used herein, "light" means not only signals in the spectrum of visible light, but also signals in the full spectrum which may be processed by optical systems. Once parameters are identified to produce desired resonant reflectance value(s), RCSLM 100 can then be constructed from an SWS having a mosaic of areas, each SWS area comprising a pixel having the desired resonant reflectance characteristics.

An embodiment of the invention is a coherent spatial light reflector adapted for fixed frequency operation. This embodiment includes a subwavelength resonant grating structure (SWS). The SWS is formed from at least one subwavelength resonant grating layer (SWL), the SWLs having a plurality of areas defining a plurality of pixels. The pixels are each adapted to produce a resonant reflective response characterized by reflecting a band of incident light while transmitting light outside the respective bands. This embodiment can function as a pixelized narrowband filter having a plurality of pixels, each pixel producing a fixed resonant reflective response.

In another embodiment of the invention, RCSLM 100 can be operated as a reflective modulator, through modulation of the resonant reflective response of SWS 101. Modulation of the SWS resonant response can be provided by modulating the refractive index of one or more layers comprising SWS 101 itself, or preferably by modulating the refractive index of one or more layers in "optical contact" with SWS 101.

For example, an electrical field may be used to modulate the resonant response of a SWS, if one or more SWS layers and/or layers in optical contact with SWS exhibits a Pockels or Kerr electro-optic effect. The term optical contact used herein refers to proximity such that electromagnetic waves propagating within SWS 101 extend into a given layer. The Kerr electro-optic effect is shown by certain liquids such as nitrobenzene, while the Pockels electro-optic effect is shown by certain crystalline materials. Most modern electro-optic modulators use the Pockels effect and are often referred to as Pockels cells.

Some materials exhibit a photo-refractive effect whereby shining a light onto a photo-refractive material changes the material's refractive index. Other materials are thermal-cavity materials, which change refractive index due to thermal expansion. Some cavity materials are magneto-optic and will change their refractive index based on applied magnetic field strength. Almost all materials show, at least to some degree, electro-optical, photo-refractive, magneto-optical, and thermal effects. Any one or a combination of these modulation methods can be used to modulate the SWS resonant response, and accordingly, to allow RCSLM 100 to modulate light incident thereon.

Figure 3:
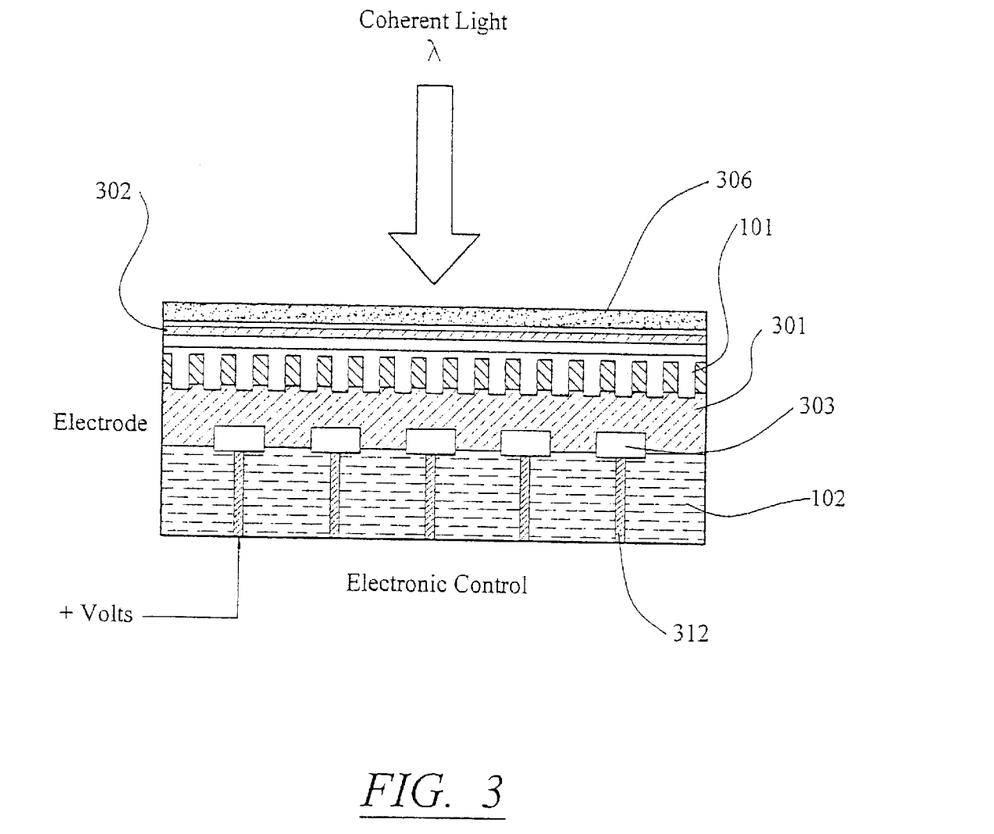
FIG. 3 illustrates a side view of a RCSLM capable of electro-optic modulation showing the various layers, according to an embodiment of the invention.

FIG. 3 shows a side view of an RCSLM 300 according to a preferred embodiment of the invention. RCSLM 300 can include an optional protective anti-reflective coating layer 306. This embodiment adds at least one layer of an electro-optic (EO) material in optical contact with SWS 101. When an EO material is subjected to an electrical field, its refractive index shifts to higher or lower values, depending on the field intensity and the EO material's crystal orientation. The change in the EO material's index of refraction being in optical contact with the SWS, causes a shift in the SWS resonant response. This shift in the SWS resonance response causes reflectance and/or phase modulation of a beam incident upon RCSLM 300. The magnitude of the EO effect generally increases as the refractive index difference between the SWS waveguide material and SWS post material increases.

FIG. 3 shows EO 301 layer positioned below SWS 101, and in optical contact with SWS 101. Accordingly, a refractive index change EO layer 301 will modify the SWS resonant response.

EO layers can also be placed above SWS 101, provided the EO layer is substantially transparent to the wavelength of interest. Alternatively, EO layers can be placed both above and/or below SWS 101. In these configurations, voltage is applied parallel to the direction of incident light propagation. These modulator configurations are referred to as longitudinal electro-optic modulators. Alternatively or in combination, conductive electrodes could be provided on the sides of the EO crystal, and voltage applied perpendicular to the direction of incident light propagation.

Although EO layer 301 is shown as being continuous, EO layers need not be continuous. Discontinuous and periodic EO layers can be used to add additional periodic structure for RCSLM 300. These additional periodic structures can be used advantageously to improve the performance of RCSLM 300 by increasing (or in some cases decreasing) the bandwidth of the reflected light.

Electro-optic (EO) materials can be chosen from materials such as CdTe, $LiNbO_3$ and SBN, depending on the wavelength for a given application. When appropriate, SBN is a preferred EO material since it has a high electro-optic coefficient. Materials having a high relative EO coefficients permit use of correspondingly lower applied voltages to produce the same desired EO effect compared to an EO material having a lower EO coefficient.

Figure 4:
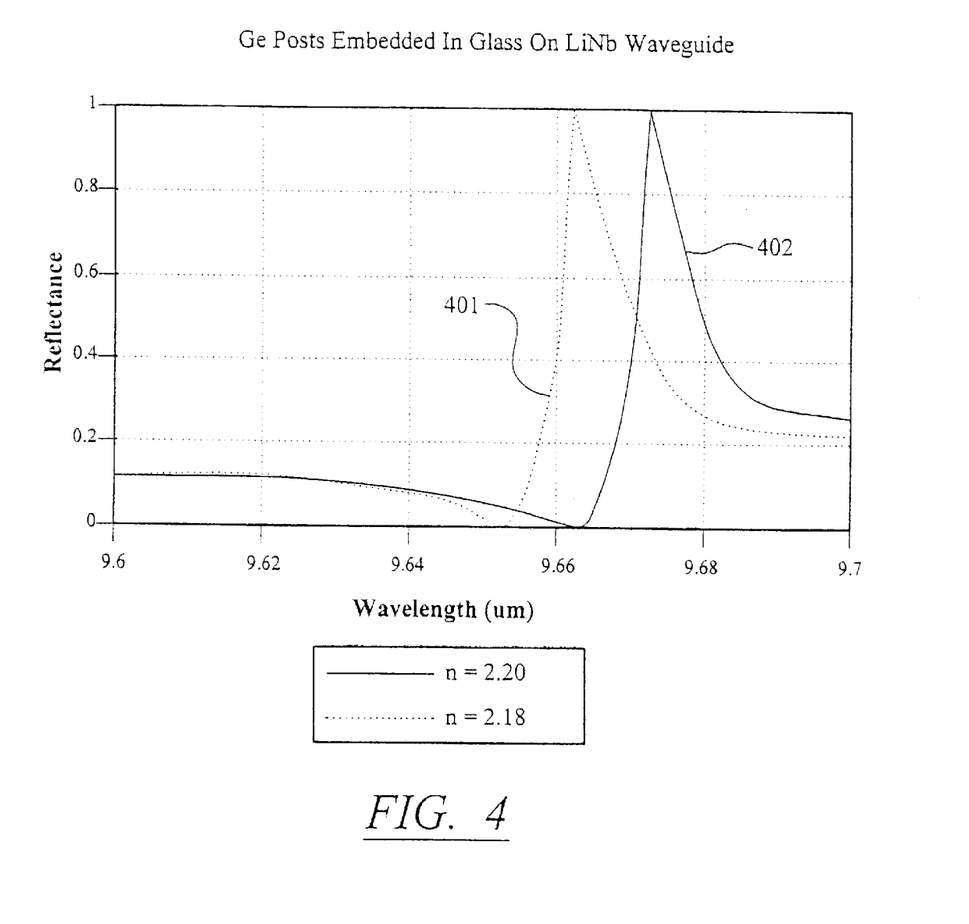
FIG. 4 illustrates the resonant reflectance shift of a RCSLM having an electro-optic layer being in optical contact with a SWS, the RCSLM adapted for operation in the infrared range at approximately $10\mu$.

FIG. 4 shows the resulting shift in the RCSLM 300 resonant reflectance, where RCSLM is adapted for operation near $10\mu$, resulting from the application of an electrical field across EO layer 301. In this example, 15 volts was applied. The spectral response shown is before and after the application of a voltage across OE layer 301, shown as 401 and 402, respectively. The SWS posts used were round and made of germanium. The waveguide material was $BaF_2$, while the EO material used was SBN. The SWS grating periodicity was $6\mu \times 6\mu$ and the SWS had a grating thickness of $15\mu$. FIG. 4 shows a 1% change in refractive index from n=2.18 to 2.20 using an electro-optic coefficient ($r_{33}$) of 1400 for SBN and an EO layer thickness of $5\mu$.

As shown in FIG. 4, at a wavelength equal to approximately $9.663\mu$, the SWS reflectance goes from approximately 0.9997 (99.97%) to approximately 0.0058 (0.58%), when the EO material is switched. This corresponds to an extinction ratio of 200 to 1, the extinction being defined as the ratio of transmission when the device is fully open, to the transmission when the device is fully closed. A high value of the extinction ratio is desirable because it determines the maximum contrast that may be obtained in a system that uses a given modulator. Thus, assuming an incident monochromatic light source having a wavelength of $9.663\mu$, RCSLM 300 can be switched between being almost entirely reflective or entirely transmissive, depending on the presence of, or absence of an applied electrical field.

Figure 5:
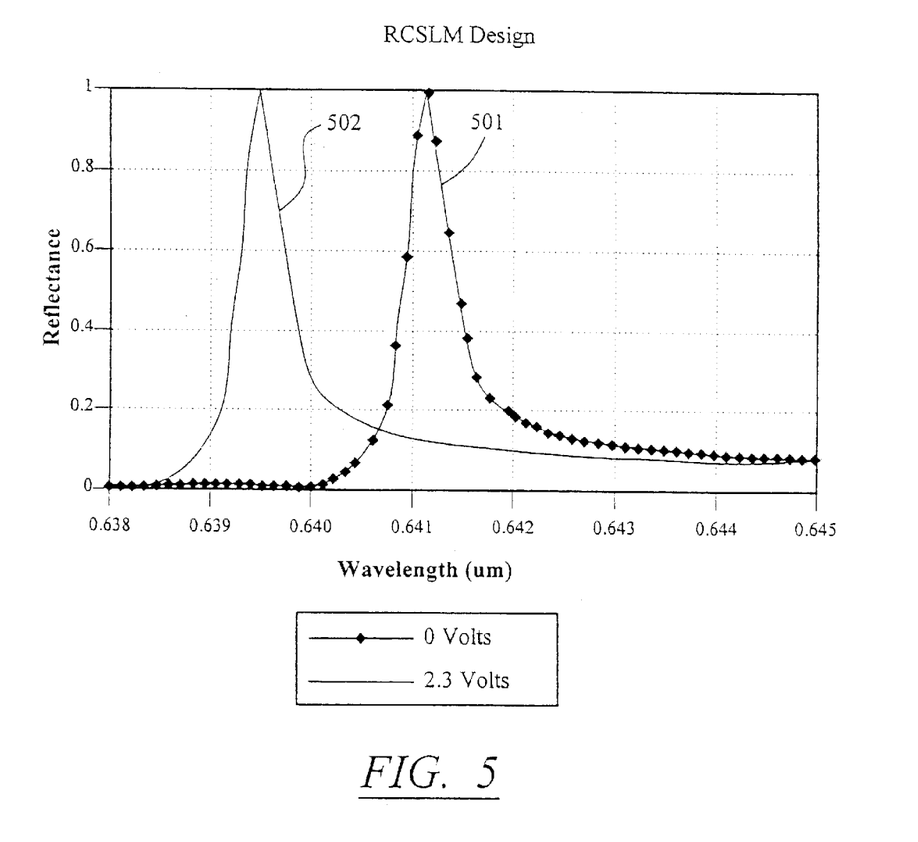
FIG. 5 illustrates the resonance reflectance shift of a RCSLM having an electro-optic layer being in optical contact with a SWS, the RCSLM adapted for operation in the visible light range.

FIG. 5 shows the resulting shift in the RCSLM 300 resonant reflectance for an RCSLM 300 based on the architecture disclosed relating to FIG. 2, also including an EO layer in optical contact with the SWS. The EO material used was either SBN or $LiNbO_3$ (n=approximately 2.3), having a thickness at $2.0\mu$, which provide equivalent results if the applied voltage is adjusted to compensate for differences in EO coefficient. In this example, the spectral response is shown for incoherent TM polarized light having an angle of incidence of 45° before and after the application of a voltage across the OE layer 301, shown as 501 and 502, respectively. If the EO material used is SBN ($r_{33}$=1400) then an applied voltage of 2.3 volts yields the shown shift to 639.6 nm in resonance. If $2\mu$ of $LiNbO_3$ ($r_{33}$=370) were used as the EO material an applied voltage of 9 volts would be required to provide the same results as with the SBN. FIG. 5 shows a 0.4% change in refractive index from n=2.30 to 2.29 by assuming an electro-optic coefficient ($r_{33}$) of 1400 for the SBN and an EO layer thickness of $5\mu$, and an extinction ratio at $0.6412\mu$ of greater than 100.

The time required to shift the EO material's index of refraction to produce desired switching can be as short as a fraction of a nanosecond. Assuming an appropriate high speed electrical signal is provided to RCSLM 300, RCSLM 300 can switch at frequencies in the tens of gigahertz, or even higher. The RCSLM 300 switching speed is generally only limited by the ability to produce and deliver voltage pulses of sufficient amplitude at high frequency to RCSLM 300.

Once again referring to the embodiment shown in FIG. 3, the RCSLM 300 shown is a longitudinal modulator having electrically conductive layers positioned above and below EO layer 301. The conductive layer positioned above EO layer 301 is referred to as the ground layer 302, which can be used to form an electrical ground plane. This layer is preferably formed as a thin layer of electrically conductive and low optical absorption material in the wavelength range of interest since incident light must pass therethrough. In the embodiment shown in FIG. 3, ground layer 302 is a single continuous layer. Preferred materials for forming ground layer are electrically conductive and substantially optically transparent metal oxides, such as InSnO. Although shown as a single continuous layer, ground layer 302 need not be one continuous layer.

Figure 6:
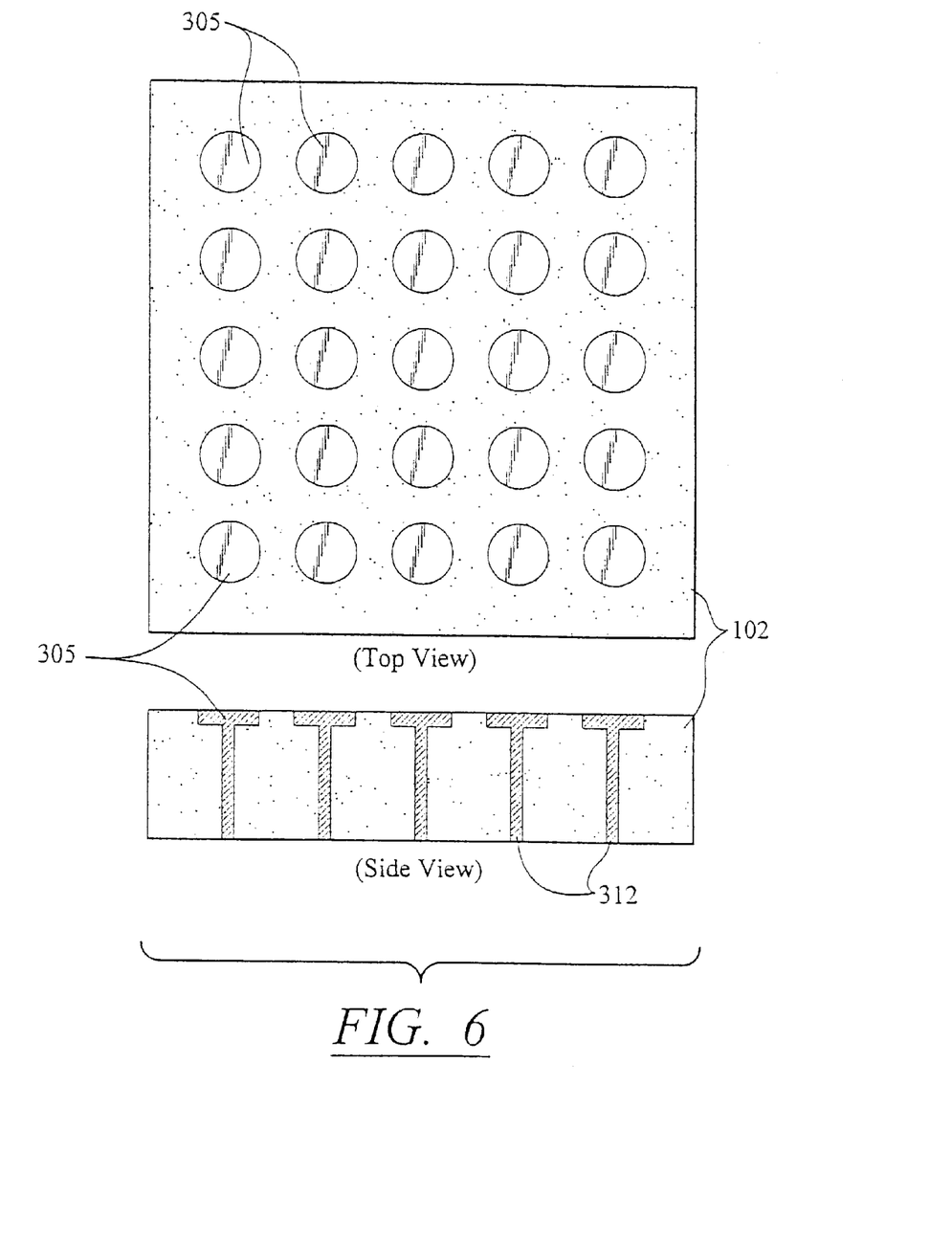
FIG. 6 illustrates top and side views of a base layer having a plurality of base layer plates, according to an embodiment of the invention.

The conductive layer shown in FIG. 3 positioned below EO layer 301 is referred to as the base layer 303. Preferably, the base layer material used is a good electrical conductor and has a refractive index similar to the adjacent EO layer material to minimize Fresnel reflections. An illustration of top and side views of base layer 303 is shown in FIG. 6, disposed adjacent to substrate layer 102. In this preferred embodiment, base layer 303 is comprised of a plurality of substantially optically transparent electrically conductive plates 305, where each plate 305 is electrically isolated from the other plates. Substantially optically transmissive plates 305 permits incident light reaching base layer 303 to be directed away from SWS 101. For example, an optically transmissive base layer 303 can direct incident light so that it can be absorbed in adjacent substrate 102, rather than being reflected back to SWS 101. Reflection of transmitted light back towards SWS 101 is highly undesirable as it can cause contrast degradation and other undesirable interference effects. Base layer 303 can comprise electrically conductive and optically transmissive layers such as InSnO, or even marginally optically transmissive layers such as Al, provided the Al layer is thin enough to be substantially optically transmissive to light in the wavelength range of interest.

Electrical isolation between base layer plates 303 permits independent control of the voltage applied to each plate 305. As a result, an RCSLM 300 which is provided appropriate control electronics can independently control which and to what extent individual EO layer areas are made subject to an applied electrical field. Thus, corresponding SWS areas (pixels) above each plate 305 can each become separately controllable to permit RCSLM 300 to individually modulate SWS areas allowing pixelization of RCSLM 300.

Base layer plates 305 can be charged and discharged by a voltage driver circuit (not shown) through connection to appropriate control electronics (not shown). Preferably, independent back plane via connections 312 are provided for each plate 305. In the preferred embodiment of the invention, RCSLM 300 is fabricated on a bulk substrate material die (e.g. Si) and an appropriate high speed voltage driver circuit and control electronics are provided on each die.

Referring again to FIG. 3, in another embodiment of the invention, a buffer layer (not shown) can be provided between ground layer 302 and SWS 101. An appropriately selected buffer layer can minimize ground layer 302 interference with the SWS resonant response. The buffer layer (not shown) can be air layer forming an air gap, or formed from other materials such as $SiO_2$, $TiO_2$ or WO, provided the buffer material selected is substantially transmissive in the wavelength range of interest. Buffer layer (not shown) can also be used to isolate rapidly diffusing materials, such as In for example, when an InSnO base layer 303 is used from diffusing into SWS 101 and other RCSLM 300 layers.

In further embodiment, RCSLM be formed from SWS 101, each SWS having asymmetrically shaped posts, such as rectangular posts. Asymmetric posts may be contrasted with symmetric post shapes, such as square or circular posts. Asymmetric SWS posts reflect light differently depending on the polarization of incident light. Asymmetric post shapes cause reflected light 111 to take on a polarization determined by the post shape. Through use of one or more appropriate polarization filters, RCSLM can enhance its signal to noise ratio by filtering out light signals not having the SWS induced polarization.

In another embodiment, an electronically controllable quarter wave plate is placed at or near the surface of RCSLM 300 to convert linearly polarized light to circularly polarized light. Assuming an unpolarized light input, this RCSLM embodiment generally requires asymmetric SWS post shapes to generate polarized light, since without post asymmetry resulting in a polarized reflected beam, a quarter wave plate will have no effect. This embodiment allows polarization and phase control and ability to alter the degree of phase modulation. As in the previous embodiment, through use of an appropriate detector capable of selecting specific polarizations and/or specific phases can result in higher attainable signal to noise ratios.

RCSLM 300 can also be configured to control the amplitude of the reflected light. For example, the roll-off region of RCSLM's resonant reflectance response corresponding to the sloped reflectance versus wavelength region between RCSLM's maximum and minimum reflectance, can be used for this purpose. In the preferred embodiment of the invention which provides enhanced amplitude control, a feedback and control system (not shown) can be used to measure the reflected light amplitude from RCSLM 300. This information can be used to signal the structure for modulating the resonant response of SWS 101 to provide an appropriate input to result in SWS 101 providing the desired reflected amplitude level. For example, in the embodiment of the invention shown in FIG. 3 which uses EO layer 301 to modulate RCSLM, a feedback control system can be used to adjust the voltage across EO layer 301 to produce the desired reflected light amplitude. Preferably, the feedback and control system is configured to separately adjust the amplitude for each RCSLM 300 pixel.

The particular manufacturing process used for fabricating the RCSLM should preferably be inexpensive and reproducible. Conveniently, the RCSLM of the present invention can be fabricated using any standard integrated optics or electronic integrated circuit manufacturing method, such as microelectromechanical systems (MEMS) or microoptoelectromechanical systems (MOEMS). Such methods can include use of standard oxidation, deposition, lithography and etching steps. For example, in applications where SWS post geometries are deep sub-micron, posts may be formed by E-beam lithography by writing the desired pattern into a photoresist layer deposited on the top of the waveguide. Once the photoresist is developed, reactive ion etching (RIE) can be used to create desired structures within the waveguiding region.

The next step can involve filling in the openings which have been etched away in the waveguide region with the appropriate post material to create the SWS. A deposition process such as LPCVD or PECVD may be used for this purpose. Finally, a polishing step, such as chemical mechanical polishing (CMP) to improve surface flatness and to eliminate any surface irregularities caused during the process may be added to reduce the lossiness of the cavity.

If it is desired to adjust the RCSLM output characteristics including the nominal resonance wavelength of RCSLM, several methods are available. For example, laser trimming can be used to trim SWS posts. Alternatively, ion implantation in conjunction with lithographic techniques can be used to direct energetic particles to particular areas to adjust the refractive index of the implanted areas.

The very small size, simple structure and standard processing steps involved in forming RCSLMs according to the invention permit fabrication on a bulk substrate material die and integration with other optical or electronic components on the same die. A plurality of RCSLMs may be formed on each die. The particular manufacturing process used for fabricating various layers is not essential to the present invention.

Figure 7:
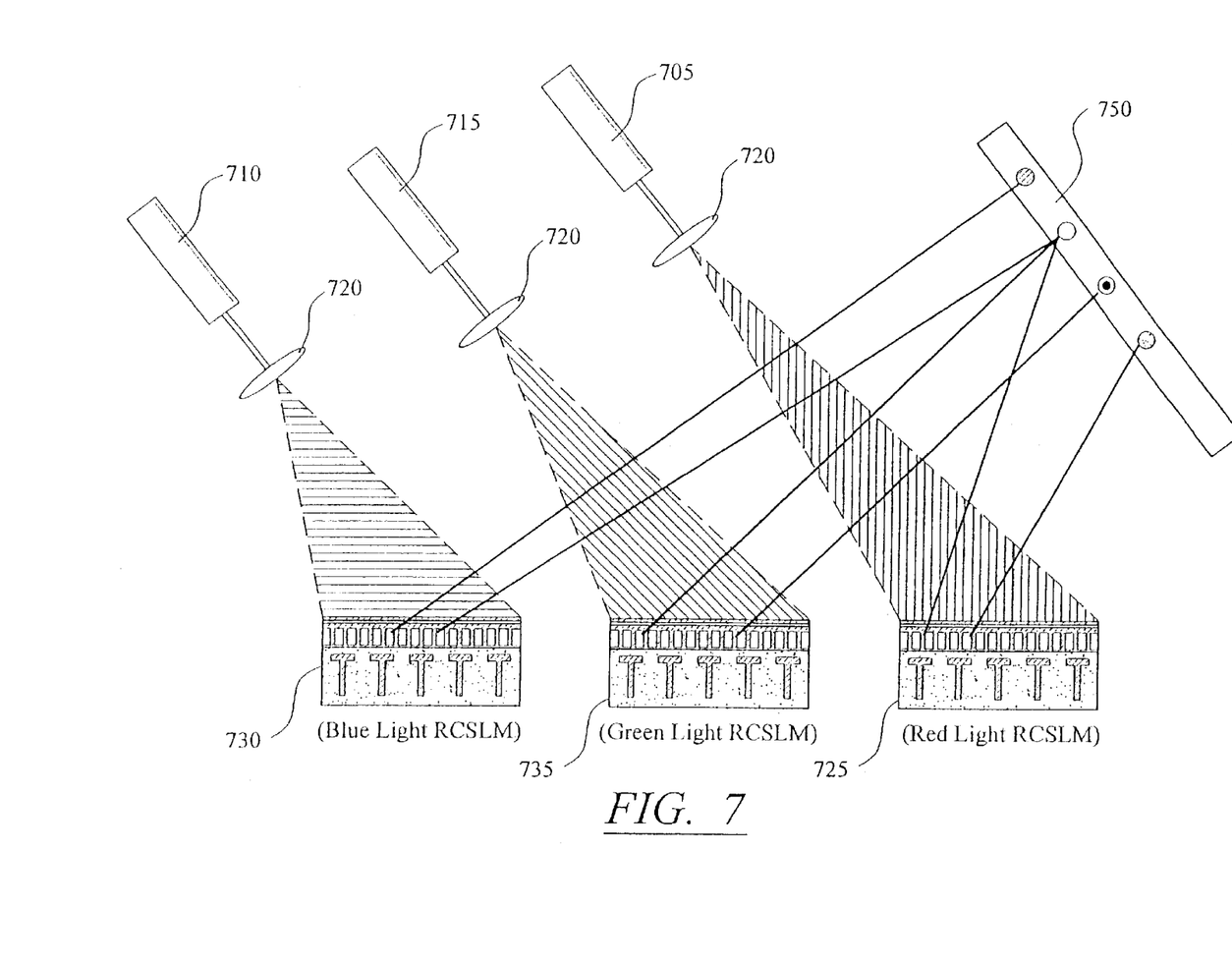
FIG. 7 illustrates the schematic of a real color image projection system, according to an embodiment of the invention.

RCSLMs can be used for a wide variety applications. For example, RCSLMs can be used to create a high efficiency, high frame rate projection image systems, such as a projection television system. FIG. 7 show how six reflected beams from three RCSLMs 725, 730 and 735 (two reflected beams shown from each RCSLM) can be used to create four different imaged colors onto a viewing screen 750. Each resultant color is created by reflecting at least one color from each of the three different RCSLMs. White light is created by mixing the three individual colors. Although four imaged colors are shown, it is should be clear that the invention can support generation of many more imaged colors.

In this embodiment, red laser 705, blue laser 710 and green laser 715 generate monochromatic light beams to illuminate respective RCSLMs, which are provided to red light RCSLM 725, blue light RCSLM 730 and green light RCSLM 735. In the preferred embodiment, the laser beams are expanded in projected area coverage to illuminate the entire RCSLM area, using a suitable optical device 720. Each RCSLM has a structure for modulating its resonant reflective response, such as an EO layer (not shown), to permit control of reflected color by using voltage across the EO material associated with a particular pixel (not shown). Each RCSLM 725, 730 and 735 is oriented such that reflected light converges on a single area, such as viewing screen 750, to form the desired image.

In another embodiment of the invention, RCSLMs can be used to create a "real" 3-D holographic projector. A hologram produces a virtual image from a laser reference diffracting off a complex interference pattern. Complex interference patterns can be generated by the RCSLM of the current invention. In this embodiment, lasers such as diode lasers can be used to function as holographic laser references. Laser references can diffract light with angular dependence to create a "real" 3-D holographic projector.

Communications transceivers can also be made from the RCSLM of the current invention. Each RCSLM pixel can act as a communication channel where the information (bits) can be modulated by modulating the reflected light from each RCSLM pixel. In the simplest structure, only one pixel (bit) exists and is modulated. Alternatively, multiple bits can also be simultaneously modulated by multiple RCSLM pixels, creating the ability to construct a broadband communications device. This embodiment can be an effective communications device, since the pixel modulation rate can be very high, permitting a correspondingly high data rate. Since the pixel modulation rate can be on the order of tens of gigahertz, permitting a correspondingly high data rate. Alternatively, stand alone and optical interconnects can be produced from the invention.

While the preferred embodiments of the invention have been illustrated and described, it will be clear that the invention is not so limited. Although generally explained in terms of a visible light applications, the invention can be used to process ultraviolet radiation, infrared radiation, etc. Numerous modifications, changes, variations, substitutions and equivalents will occur to those skilled in the art without departing from the spirit and scope of the present invention as described in the claims.

What is claimed is:

1. A reflective coherent spatial light modulator (RCSLM), comprising:
    a subwavelength resonant grating structure (SWS), said SWS formed from at least one subwavelength resonant grating layer (SWL), said SWLs having a plurality of areas defining a plurality of pixels, said plurality of pixels adapted to produce a resonant reflective response characterized by reflecting a band of incident light while transmitting light outside said band, and
    structure for modulating a resonant reflective response of at least one pixel from said plurality of pixels.

2. The RCSLM of claim 1, wherein said structure for modulating includes at least one electro-optic layer, said at least one electro-optic layer disposed in optical contact with at least one of said SWLs.

3. The RCSLM of claim 2, further comprising a structure for modulating the refractive index of said at least one electro-optic layer.

4. The RCSLM of claim 3, further comprising a first electrically conductive layer and a second electrically conductive layer, said at least one electro-optic layer positioned substantially between said electrically conductive layers.

5. The RCSLM of claim 4, wherein at least one of said electrically conductive layers comprises a plurality of electrically conductive plates, said plurality of plates substantially electrically isolated from one another and adapted to control said resonant reflective response of individual ones of said plurality of pixels.

6. The RCSLM of claim 1, wherein said RCSLM is formed on a die.

7. The RCSLM of claim 5, wherein said RCSLM is formed on a die, said die having electronic components including control electronics a high speed voltage driver circuit, wherein said plurality of pixels are separately switchable by application by said control electronics of a voltage signal from said high speed voltage driver circuit to said plurality of plates.

8. The RCSLM of claim 7, wherein said plurality of plates are adapted for connection to said electronic components through back plane via connections.

9. The RCSLM of claim 1, further comprising an anti-reflective coating layer disposed on a surface of said RCSLM.

10. The RCSLM of claim 4, further comprising an anti-reflective coating layer disposed on a surface of said RCSLM and a buffer layer disposed between said anti-reflective coating layer and said second conductive layer.

11. The RCSLM of claim 10, wherein said buffer layer is at least one selected from the group consisting of air, $SiO_2$, $TiO_2$, and WO.

12. The RCSLM of claim 1, wherein said at least one SWL comprises a plurality of features, at least a portion of said features having asymmetric exposed surfaces.

13. The RCSLM of claim 12, further comprising an electronically controllable quarter wave plate.

14. RCSLM of claim 7, wherein said electronic components include an amplitude controller for controlling amplitude of light reflected from said plurality of pixels.

15. The RCSLM of claim 14, wherein said amplitude controller includes a feedback and control system.

16. The RCSLM of claim 15, wherein said feedback and control system is adapted to separately control amplitudes of light reflected by said plurality of pixels.

17. A method for forming a reflective coherent spatial light modulator (RCSLM), comprising the steps of:
    selecting a waveguide material having a first refractive index, and
    forming a subwavelength resonant grating structure (SWS), said SWS formed from at least one subwavelength resonant grating layer (SWL) in said waveguide material, said SWLs having a plurality of areas defining a plurality of pixels, said plurality of pixels adapted to produce a resonant reflective response characterized by reflecting a band of incident light while transmitting light outside said band.

18. The method for forming a RCSLM of claim 17, wherein said at least one SWL comprise a plurality of features formed from at least one material having a second refractive index greater than said first refractive index.

19. The method for forming a RCSLM of claim 17, further comprising the step of providing at least one electro-optic layer, said at least one electro-optic layer disposed in optical contact with at least one of said SWL.

20. The method for forming a RCSLM of claim 19, further comprising a first electrically conductive layer and a second electrically conductive layer, said at least one electro-optic layer positioned substantially between said electrically conductive layers.

21. The method for forming a RCSLM of claim 20, wherein at least one of said electrically conductive layers comprises a plurality of electrically conductive plates, said plurality of plates substantially electrically isolated from one another and adapted to control said resonant reflective response of individual ones of said plurality of pixels.

22. The method for forming a RCSLM of claim 17, further comprising the step of providing a bulk substrate material having a plurality of die, wherein a plurality of said RCSLMs are formed on said plurality of die.

23. The method for forming a RCSLM of claim 21, further comprising the step of forming electronic components including control electronics and a high speed voltage driver circuit on said die, wherein said plurality of pixels are separately switchable by application by said control electronics of a voltage signal from said high speed voltage driver circuit to said plurality of plates.

24. The method for forming a RCSLM of claim 23, further comprises the step of forming a plurality of back plane via connections, wherein said plurality of plates are provided electrical connection to said electronic components.

25. The method for forming a RCSLM of claim 17, wherein at least one of said SWLs comprises a plurality of features, at least a portion of said plurality of features having asymmetrical exposed surfaces.

26. A high frame rate projection image system, comprising:
at least three RCSLMs, each of said RCSLMs adapted to reflect a different wavelength band, each of said RCSLMs comprising:
a subwavelength resonant grating structure (SWS), said SWS formed from at least one subwavelength resonant grating layer (SWL), said SWLs having a plurality of areas defining a plurality of pixels, said plurality of pixels adapted to produce a resonant reflective response characterized by reflecting a band of incident light while transmitting light outside said band;
structure for modulating a resonant reflective response of at least one pixel from said plurality of pixels;
structure for providing a light beam to each of said RCSLMs, said light beams provided having wavelengths within said RCSLM wavelength bands, and
a viewing screen for receiving reflected light from said RCSLMs.

27. A method for modulating light, comprising:
providing a reflective coherent spatial light modulator (RCSLM) comprising a subwavelength resonant grating structure (SWS), said SWS formed from at least one subwavelength resonant grating layer (SWL), said SWLs having a plurality of areas defining a plurality of pixels, at least one from said plurality of pixels adapted to produce a resonant reflective response characterized by substantially reflecting a band of incident light, and structure for modulating the resonant reflective response of the at least one pixel from said plurality of pixels, and
modulating said reflective response of the at least one pixel to said band of incident light between said substantially reflecting state and a substantially transmitting state.

28. The method of claim 27, wherein said modulating is electronic modulating.

29. The method of claim 28, wherein said electronic modulating is electro-optic modulating.

30. The method of claim 29, wherein a voltage is applied across at least one electro-optic layer, said at least one electro-optic layer disposed in optical contact with the at least one pixel.

31. The method of claim 30, wherein said voltage is capable of variation, said voltage variation modulating said reflective response of the at least one pixel.

32. The method of claim 27, wherein said plurality of pixels are separately controllable and adapted to produce a plurality of distinct resonant reflective responses, further comprising the step of separately modulating said reflective responses of said plurality of pixels.

33. The method of claim 32, wherein said modulating is electro-optic modulating.

34. A method for processing an electromagnetic signal which comprising the step of utilizing the RCSLM of claim 1, wherein said utilizing includes at least one selected from the group consisting of image projecting systems, 3-D holographic projecting and communications transceiving.

35. A coherent spatial light reflector adapted for fixed frequency operation, comprising:
a subwavelength resonant grating structure (SWS), said SWS formed from at least one subwavelength resonant grating layer (SWL), said SWLs having a plurality of areas defining a plurality of pixels, said plurality of pixels each adapted to produce a resonant reflective response characterized by reflecting a band of incident light while transmitting light outside said respective band.

* * * * *